US008154590B2

(12) United States Patent
Kressel et al.

(10) Patent No.: US 8,154,590 B2
(45) Date of Patent: Apr. 10, 2012

(54) METHOD FOR OBSERVATION OF A PERSON IN AN INDUSTRIAL ENVIRONMENT

(75) Inventors: Ulrich Kressel, Ulm (DE); Lars Krueger, Ulm (DE); Werner Progscha, Herrenberg (DE); Christian Woehler, Heroldstatt (DE); Franz Kummert, Bielefeld (DE); Joachim Schmidt, Bielefeld (DE); Rainer Ott, Ulm (DE); Gerhard Sagerer, Bielefeld (DE)

(73) Assignee: Pilz GmbH & Co. KG, Ostfildern (DE)

( * ) Notice: Subject to any disclaimer, the term of this patent is extended or adjusted under 35 U.S.C. 154(b) by 665 days.

(21) Appl. No.: 12/362,745

(22) Filed: Jan. 30, 2009

(65) Prior Publication Data
US 2009/0237499 A1 Sep. 24, 2009

Related U.S. Application Data

(63) Continuation of application No. PCT/EP2007/003037, filed on Apr. 4, 2007.

(30) Foreign Application Priority Data

Aug. 2, 2006 (DE) .......................... 10 2006 036 400
Oct. 10, 2006 (DE) .......................... 10 2006 048 166

(51) Int. Cl.
*G06K 9/00* (2006.01)
(52) U.S. Cl. ....................................................... 348/77
(58) Field of Classification Search ...................... 348/77
See application file for complete search history.

(56) References Cited

U.S. PATENT DOCUMENTS

| 6,516,099 | B1* | 2/2003 | Davison et al. ................ 348/42 |
| 6,956,469 | B2* | 10/2005 | Hirvonen et al. ............. 348/143 |
| 7,353,082 | B2* | 4/2008 | Pretlove et al. ............... 700/264 |
| 7,460,125 | B2* | 12/2008 | Yang et al. ..................... 709/202 |
| 7,508,977 | B2* | 3/2009 | Lyons et al. .................... 348/42 |
| 2002/0165642 | A1 | 11/2002 | Sakaue et al. |
| 2005/0033497 | A1* | 2/2005 | Stopczynski .................. 701/45 |
| 2005/0207618 | A1 | 9/2005 | Wohler et al. |
| 2006/0186702 | A1* | 8/2006 | Kisanuki et al. ......... 296/187.04 |
| 2008/0285807 | A1* | 11/2008 | Lee et al. ....................... 382/107 |
| 2008/0312765 | A1* | 12/2008 | Gardiner et al. .............. 700/132 |

FOREIGN PATENT DOCUMENTS

| DE | 102 45 720 A1 | 4/2004 |
| DE | 10 2006 013 598 A1 | 3/2007 |
| EP | 1 061 487 A1 | 12/2000 |
| EP | 1 482 238 A2 | 12/2004 |
| WO | 2004/029502 A1 | 4/2004 |
| WO | 2004/055732 A1 | 7/2004 |

OTHER PUBLICATIONS

Gandhi, T.; Trivedi, M.M.;, "Pedestrian collision avoidance systems: a survey of computer vision based recent studies," Intelligent Transportation Systems Conference, 2006. ITSC '06. IEEE , vol., no., pp. 976-981, Sep. 17-20, 2006.*

D.M. Gavrila; The Visual Analysis of Human Movement: A Survey; Jan. 1999; pp. 82-98.
C. Chang et al.; Multiple Object Tracking with Kernel Particle Filter; 2005; pp. 566-573.
D. Ebert et al.; Simero—Sichere Mensch-Roboter-Koexistenz [Simero—safe human/robot coexistence]; 2003; pp. 119-134.
D.M. Gavrila; The Visual Analysis of Human Movement: A Survey; 1999; pp. 1-43.
M. Oren et al.; Pedestrian Detection Using Wavelet Templates; 1997; pp. 193-199.
T. Horprasert et al.; Real-time 3D Motion Capture; Nov. 1998; pp. 87-90.
I. Mikic et al.; Human Body Model Acquisition and Tracking Using Voxel Data; Jul. 2003; pp. 199-223.
M. Pardas et al.; Body detection, tracking and analysis; http://www-rocq.inria.fr/imedia/Muscle/WP5-FFM-docs/E-TEAM-BODY-3.ppt; 2005; 40 pages.
C. Papageorgiou et al.; A Pattern Classification Approach to Dynamical Object Detection; 1999; pp. 1223-1228.
D.M. Gavrila et al.; Real-Time Object Detection for "Smart" Vehicles; 1999; pp. 87-93.
D.M. Gavrila et al.; Vision-Based Pedestrian Detection: The PROTECTOR System; 2004; pp. 13-18.
C. Wöhler; Neuronale Zeitverzögerungsnetzwerke für die Bildsequenzanalyse und ihre Anwendung in fahr-zeuggebundenen Bildverarbeitungssystemen. [Neural time delay networks for image sequence analysis, and application in vehicle-bound image processing systems]. Dissertation. Mathematisch-Naturwissenschaftliche Fakultät der Rheinischen Friedrich-Wilhelms-Universität Bonn, 2000 VDI-Fortschritt-Berichte, series 10, No. 645, VDI-Verlag, Düsseldorf, 2000; 3 pages. M.J.S. Day et al.; A Projection Filter for Use with Parameterised Learning Models; 1998; pp. 867-869.
A. Baumberg et al.; An Efficient Method for Contour Tracking Using Active Shape Models; Apr. 1994; pp. 1-16.
B. Heisele et al.; Motion-Based Recognition of Pedestrians; 1998; pp. 1325-1330.
Y. Guo et al.; Understanding Human Motion Patterns; 1994; pp. 325-329.
I.-Cheng Chang et al.; Ribbon-Based Motion Analysis of Human Body Movements;1996; pp. 436-440.
K. Akita; Image Sequence Analysis of Real World Human Motion; 1984; pp. 73-83.
W. Long et al.; Log-Tracker: An Attribute-Based Approach to Tracking Human Body Motion; 1991; pp. 439-458.
R. Kahn et al.; Gesture Recognition Using the Perseus Architecture; 1996; pp. 734-741.

(Continued)

*Primary Examiner* — Ajay Bhatia
(74) *Attorney, Agent, or Firm* — Harness, Dickey & Pierce, P.L.C.

(57) ABSTRACT

A method for observing a person in an industrial environment using a multicamera system to acquire image data about the position and alignment of a person, including a person's body parts. These image data are then examined with regard to the imaging of a person so that whenever a person has been detected in the image data, an articulated virtual 3D model of the human body is matched to this person hypothesis. Subsequently, this virtual body model is continuously matched to the movement behavior of the person detected in the image data. A hazard potential is determined using knowledge of the position and the movement behavior of the virtual body model in space. The hazard potential thus determined is subjected to a threshold value comparison in order to act upon the movement control of the machine or the machine part in the event of this threshold value being exceeded.

14 Claims, No Drawings

OTHER PUBLICATIONS

B. Rosenhahn et al.; A System for Marker-Less Human Motion Estimation; 2005; pp. 230-237.

S.U. Lee et al.; 3D Hand Reconstruction from a Monocular View; 2004; pp. 310-313.

A. Ramamoorthy et al.; Recognition of dynamic hand gestures; 2003; pp. 2069-2081.

C. Nölker et al.; Visual Recognition of Continuous Hand Postures; 2002; pp. 1-12.

G. Heidemann et al.; Hand Gesture Recognition: Self-Organising Maps as a Graphical User Interface for the Partitioning of Large Training Data Sets; 2004; 4 pages.

J. Fritsch et al.; Combining Sensory and Symbolic Data for Manipulative Gesture Recognition; 2004; pp. 930-933.

Z. Li et al.; Hierarchical Modelling and Recognition of Manipulative Gesture; 2005; pp. 1-8.

J. Fritsch et al.; Erkennung von Konstruktionshandlungen aus Bildfolgen [Detection of building actions from image sequences]; 2000; pp. 389-396.

E. Braun et al.; Incorporating Process Knowledge into Object Recognition for Assemblies; 2001; pp. 726-732.

H. Bekel et al.; Adaptive Computer Vision: Online Learning for Object Recognition; 2004; pp. 1-8.

* cited by examiner

METHOD FOR OBSERVATION OF A PERSON IN AN INDUSTRIAL ENVIRONMENT

CROSS REFERENCES TO RELATED APPLICATIONS

This application is a continuation of international patent application PCT/EP2007/003037 filed on Apr. 4, 2007 designating the U.S., which international patent application has been published in German language as WO 2008/014831 A2 and claims priority from German patent applications DE 10 2006 036 400.7 filed on Aug. 2, 2006 and DE 10 2006 048 166.6 filed on Oct. 10, 2006. The entire contents of these prior applications are incorporated herein by reference.

BACKGROUND OF THE INVENTION

The invention relates to a method for observation of a person in an industrial environment.

Present day industrial manufacturing processes in automobile production can generally being divided into fully automatic cycles that are carried out exclusively by machines, and completely manual cycles that are carried out exclusively by individual workers or a number of workers cooperating with one another. To date, the close cooperation between persons and machines, in particular industrial robots, has been greatly limited owing to safety aspects. A plurality of complicated and expensive safety systems such as, for example, metal fences, light barriers, laser scanners or combined systems are required in order to keep workers in the production environment away from potentially hazardous machines. The systems are incapable of detecting the exact location, the body posture or the movement behavior of the human. As soon as a worker approaches the robot, the latter is stopped and the production process is interrupted.

The missing "knowledge" of such safety systems that relates to the monitored production environment is particularly disadvantageous in that the manufacturing processes greatly profit from a close collaboration of human and machine. Whereas the human behaves flexibly and adaptively, but is inclined to make mistakes when carrying out repetitive work operations, machines operate quickly and exactly but in this case are static and not very flexible. For example, in the case of a completely automatic manufacturing unit consisting of a number of cooperating robots the production process must be stopped when a single one of the cooperating robots is defective. It would be desirable here to replace the defective robot temporarily by a human worker who cooperates with the remaining robots such that the production can be continued. Efficiency, flexibility and quality of industrial manufacturing can be raised considerably by close cooperation of humans and machines for the purpose of semi-automated processes.

Present day safety systems in the field of industrial production consist mostly of metal fences, light barriers and/or laser scanners. The first approaches are being made to securing robot protection zones on the basis of image processing, and these are described in detail in [1] and [2]. The method described in [1] uses stereo image analysis to detect whether an object is located in the protection zone of the robot, without in so doing extracting information about the nature of the object (for example human or object) or its movement behavior. In [2] a person is detected exclusively with the aid of the skin color of the hands, something which leads to problems with the reliability of detection in the case of inconstant lighting conditions (variable color temperature); the method described cannot be employed at all when working gloves are used. Just like the prior art set forth in [1], these methods do not extract any information about the type of the object. Again, in the case when a person is involved they do not detect the body parts and the movement behavior of said person. Such systems are therefore certainly capable of shutting down a robot when a person intrudes into its protection zone, but are incapable of detecting whether a collision is being threatened or whether human and machine are cooperating regularly and without any hazard in the case when a person is located in the immediate vicinity of the robot.

In accordance with the review article [3], in the field of the recognition of persons the appropriate approaches are divided into two-dimensional methods with explicit shape models, or no models, and into three-dimensional models. In [4], windows of different size are pushed over the initial image; the corresponding image regions are subjected to a Haar wavelet transformation. The corresponding wavelet coefficients are obtained by applying differential operators of different scaling and orientation to different positions of the image region. A small subset of the coefficients based on their absolute value and their local distribution in the image are selected "by hand" from this set of features, which can be very large in some circumstances. This reduced set of features is fed for classification to a support vector machine (SVM). For detection purposes, windows of different size are pushed over the image, and the corresponding features are extracted from these image regions; the SVM subsequently decides whether the corresponding window contains a person or not. In [5], temporal sequences of two-dimensional Haar wavelet features are combined to form high dimensional feature vectors, and these are classified with the aid of the SVMs, thus resulting in a gain in detective performance by comparison with the pure individual image approach. In [6], the method of chamfer matching is applied to the detection of pedestrian contours in the scenario of road traffic using a non-stationary camera. In [7], the technique of chamfer matching is combined with a stereo image processing system and a neural network with local receptive fields in accordance with [8] which is used as a texture classifier in order to attain a reliable and robust classification result.

Other methods use statistical shape models in order to detect and to track persons. Here, [9] concerns models that are obtained by means of a training phase and in which exemplary contours are described by positions of feature points. The parameter set is reduced by using a principal component analysis (PCA), thus resulting in a certain generalization ability in addition to a reduction in the computational outlay. This is useful in the event of the tracking of such a deformable contour, for example of a moving pedestrian, over time, since parameter sets inconsistent with the learning set are avoided from the very first. It is not only the contours of whole persons that can be detected—so also can those of a hand, and the corresponding movements can be detected. However, with this approach all the features must be present at any time, and for this reason no instances of masking are permitted. Furthermore, it is not excluded that the parameterization determined by the training phase permits physically impossible states. The shape representation is given by B splines in [10]. Assuming a stationary camera, the person is segmented out from the background by difference image analysis; the tracking algorithm operates with Kalman filters.

Elsewhere, the technique of color cluster flow is used [11] in order to detect persons in image sequences recorded with a moving camera. Even in the event of partial masking of the person, it is therefore possible to detect persons and track them over time very reliably. This detection stage is combined with the TDNN classification approach described in detail in [8].

Recent work relating to a complete, real time system for detecting pedestrians in road traffic scenes and consisting of a detection stage, a tracking stage and an object classification stage are described in [12].

Another group of methods for detecting persons are model based techniques in which explicit prior knowledge about the appearance of persons is used in the form of a model. Since instances of masking of parts of the body are problematic in this case, many systems additionally assume prior knowledge about the type of the movements to be detected and the viewing angle of the camera. The persons are segmented out by subtraction of the background, for example, and this presupposes a stationary camera as well as a background which does not change, or changes only slowly. The models used consist, for example, of straight rods ("stick figures"), with individual body parts being approximated by ellipsoids [13-16].

An example of the simultaneous use of the very different features of intensity, edges, distance and movement for the purpose of a multi-cue approach to the detection of persons standing or moving in a fashion aligned laterally to the camera is described in [17]. This approach is "object oriented" to the effect that for a specific application generic objects are defined (for example person, background, floor, light source) and associated methods are made available for detecting these objects in the image. If a few object properties are extracted from the image, the objects are instantiated such that it is possible subsequently to apply further, specialized methods.

Commercial systems for three-dimensional determination of the posture (location and fashion in which the body parts are adopted) of persons are based on the detection of marks applied to the body. A powerful method for marker-less three-dimensional determination of posture is described in [18].

A large portion of the work on detection of the posture of persons is concentrated on the 3D reconstruction of the hands. In [19], the hand is described by an articulated model with kinematic constraints, in particular with regard to physically possible joint angles. These constraints enable determination of the three-dimensional position, posture and movement of the hand. A method for detecting movement cycles of the hands (and gestures) that is based on a contour analysis, a tracking stage and a classifier, based on hidden Markov models (HMMs), for the movements is described in [20]. The GREFIT system described in [21] is capable of classifying the dynamics of hand postures on the basis of gray scale images with the aid of an articulated model of the hand. In a first stage, a hierarchical system of neural networks localizes the 2D position of the finger tips in the images of the sequence. In the second stage, a further neural network transforms these values into the best fitting 3D configuration of the articulated hand model. In [22], hand postures are detected directly by labeling corresponding images by means of a self-organizing map (SOM) and by subsequent training with the aid of a neural network.

A trajectory analysis that is based on a particle filter and which also includes symbolic object knowledge is used in [23] the detection of "manipulative gestures" (hand movements that serve for gripping or displacing objects). This approach is extended in [24] in the context of human/robot interaction to the effect that the classification of the hand trajectory by a hidden Markov model is performed in combination with a Bayes network and a particle filter. An approach to the classification of building actions (for example assembly of parts) by an analysis of movement patterns with the aid of the particle filter approach is described in [25]. It is described in [26] how the results of the analysis of the hand movements are integrated with the aim of a more reliable object detection in an approach for detecting components composed from individual elements. In this context, [27] describes a view-based system in which objects are detected by means of neural networks that can be subsequently trained online, that is to say during the operating phase.

A method for 3D modeling of a person starting from 2D image data is described in [30]. Here, a multicamera system is used to acquire image data of a person, and body parts of the latter identified in the 2D image data, in particular by means of a template matching. The body parts thus identified are then modeled by dynamic template matching with the aid of 3D templates. The result of this is that the persons can be identified quickly and continuously even if they are partially masked, or temporarily could not be acquired by the multi-camera system. The detected persons are then tracked in the image data with the aid of a kinematic movement model and of Kalman filters.

An identification of persons and their body parts within image data transformed into 3D space is described in [31]. 3D voxel data are generated starting from the image data generated by a multicamera system. Proceeding therefrom, corresponding templates are matched to body parts by means of specific matching algorithms. Here, as well, reference is made to a kinematic body model as previously in the case of [30].

In addition to generation of 3D person models from 2D image data and general movement analysis, the contributions described in [32] additionally indicate a first approach to the analysis of the biometric behavior of the observed persons, in particular their gestures ("hand raising for signaling the desire to ask a question").

The prior art described above shows that a plurality of methods based on the image processing are known for the purpose of detecting persons in different complex environments, for detecting body parts and their movement cycles, and for detecting complex objects composed of individual parts and the corresponding assembly activities. The applicability of these algorithms is, however, frequently described only with the aid of purely academic applications.

SUMMARY OF THE INVENTION

The object of the invention is to provide an approach for a camera-based detection and modeling of persons in an industrial environment.

According to one aspect of the invention, there is provided a method for observation of a person in an industrial environment comprising a moveable machine element, the method comprising the steps of: acquiring image data of the person by means of a multicamera system, analyzing the image data in order to produce a person hypothesis representing the person, providing an articulated virtual 3D model of a human body, matching the articulated virtual 3D model of the human body to the person hypothesis in order to generate a movement behavior representation, determining an instantaneous position of the machine element, determining a hazard potential depending on the position of the machine element and the movement behavior representation, and controlling the machine element as a function of the hazard potential.

According to another aspect, there is provided A method for observation of a person in an industrial environment comprising a moveable machine element, the method comprising the steps of: acquiring image data of the person by means of a multicamera system, analyzing the image data in order to produce a person hypothesis representing the person, providing an articulated virtual 3D model of a human body, matching the articulated virtual 3D model to the person hypothesis, providing a database containing a plurality of reference data representing a reference movement cycle of the person, the reference data having been determined from shape and position of the articulated virtual 3D model during a plurality of reference movement phases, generating current data representing a current movement of the person as a function of a current shape and position of the articulated virtual 3D model, correlating the current data with the reference data from the database, wherein a current movement phase is detected whenever the current data exhibits a predefined degree of similarity to the reference data, wherein a movement cycle is assessed as having been completely carried out by the person whenever a specific sequence of current movement phases has been detected, and wherein a signal is produced whenever an incomplete movement cycle is determined.

DESCRIPTION OF PREFERRED EMBODIMENTS

In order to obtain the most detailed information possible about the position and alignment of a person, in particular also with reference to body parts thereof, in an industrial environment, image data of the person are acquired by means of a multicamera system. These image data are then examined with regard to the imaging of a person such that whenever a person has been detected in the image data an articulated, virtual 3D model of the human body is matched to this person hypothesis. Subsequently, this virtual body model is continuously matched to the movement behavior of the person detected in the image data.

In a first refinement of the observation of a person in an industrial environment, the position and/or the movement behavior of a machine or a machine element located in the environment of the person is determined. A hazard potential can be determined starting from knowledge of the position and of the movement behavior of the virtual body model in space. The hazard potential thus determined is subjected to a threshold value comparison in order to act upon the movement control of the machine or the machine part in the event of this threshold value being exceeded.

In a particularly advantageous way, acting upon the movement control of the machine or the machine part effects a shutdown thereof or a slowing down of the movement thereof. If only a slowing down of the movement is effected, the machine or its movable machine element is able to continue the work operation with a simultaneous reduction in the hazard potential.

This way of observing persons renders it possible in a particularly advantageous way to apply the method for securing a hazard in the context of reliable human/machine interaction. It is thereby possible to allocate a location- and time-dependent variable degree of hazard to the monitored spatial areas as a function of the current position and the current movement state of a machine or a machine element, as well as of the observed person.

In the alternative refinement of the observation of persons in an industrial environment, data are continuously derived therefrom as a function of the current shape and position of the virtual body model and are correlated with the data of a database. In this case, the database contains a plurality of data that have been determined in advance from shape and position of a body model during a plurality of movement phases describing a movement cycle of a person. In this case, in the course of the method those movement phases are regarded by the observed person as having been adopted by the observed person whenever the data derived from the current body model thereof exhibits a certain degree of similarity to the data stored in relation to this movement phase in the database. If in this case a specific sequence of movement phases stored in the database is detected, the movement cycle is then regarded as having been completely carried out by the observed person. If, however, the movement cycle is assessed as having been incompletely carried out, signaling to this effect is performed.

This type of observation of a person advantageously enables the method for checking movement and work cycles to be applied in the industrial production field. By way of example, a complex manual mounting cycle is thereby checked during its execution as to whether appropriate work is carried out completely and in the correct sequence. Should the observed movement cycle deviate from the expected one, this can be signaled. Particularly in the case of highly complex modules such as, for example, aggregates, this type of quality inspection is substantially more effective than checking the assembly together with possible subsequent reworking, since in the latter case modules may be required to be completely or partially disassembled, and this is associated in turn with a high outlay on time and costs.

A further advantageous field application of this alternative refinement of the invention is the supervision of newly trained operating staff. Many mistakes arise in production when, for example, a new workforce needs to be trained immediately during a vacation. The work cycles can be observed by newly trained operating staff by means of the invention. It is then possible to advise when it is found that movement phases required within a movement cycle to be performed have not been fulfilled, thus resulting in the need to assume that a work operation has not been correctly carried out.

In a particularly advantageous way, in the course of signaling a movement cycle assessed as incomplete a reference is made to at least one of the movement phases that is viewed as not having been adopted in the course of checking a correct sequence with reference to the movement cycle. In this way, it is particularly easy for the observed person to detect the mistake in his/her movement cycle or in his/her execution of the operation. On the other hand, a trainer can detect which sections of the learned activity are still found to be difficult by the trainee and possibly require additional explanation or further training.

A statistical acquisition of the movement phases not detected as having been adopted can advantageously also enable problematic movement phases to be detected ergonomically within an entire movement cycle and, if appropriate, to be optimized by resetting the sequence of the movement phases, or by modifying the systems or objects to be operated to the observed person.

In order to arrive at the data relating to the individual movement phases and/or the movement cycle for the sake of the database, it is obvious to obtain said data by means of a plurality of training cycles while the recorded images of the space to be observed, the person or the machine are being acquired by means of the multicamera system. Alternatively or in addition, it is, however, also very well conceivable to generate the data of the database by simulating the movement cycle and the image information to be expected in this regard, doing so on a computer system. Thus it also becomes advantageously possible for the observation system to be already preinitialized in the factory in parallel with the system design and its implementation by means of the data of the observation system that are determined by simulation.

In a particularly advantageous way, the data volumes can be managed in the database, and the outlay on processing, can also be reduced by subjecting the image data stored therein to a transformation, in particular a main axis transformation. For this purpose, the correlation for determining the similarity of the currently acquired image data with the data of the database is performed on the basis of said transformed image data.

In a particularly advantageous way, the 3D model of the person is created on the basis of 3D point data. These point data can be created by multiocular image analysis, in particular including stereo image analysis. For example, it is possible for information items related to each 3D point in space that go beyond the spatial coordinates (x, y, z) thereof, such as its speed or acceleration, to be obtained by the use of a stereo method (as described in [28], for example) based on space time features. The segmentation of a plurality of 3D point data (3D-point cloud) is advantageously performed by means of a cluster method, in particular by means of agglomerative clustering. The convex envelope is subsequently determined for each extracted cluster of 3D points. Simple features are first determined for each cluster, in particular its height or volume, in order to detect persons. It is then possible in this way for invalid, irrational clusters to be rejected, particularly starting from a-priori knowledge of the properties of a natural person. It is thus advantageously possible to combine neighboring clusters to form persons when the individual clusters do not overlap and the corresponding constraints with regard to shape and size are observed for the resulting overall object.

3D points are unnecessarily excluded in the previous step, in particular foot points in the vicinity of the floor or contact points with other objects, are preferably reinstated. The result of this first processing step is the persons in the scene, represented as convex envelopes of the clusters representing them. Over time, the person thus detected can advantageously be tracked by tracking the convex envelope, projected onto the floor, that produces a 2D polygon, doing so by means of linear prediction and Kalman filtering.

An articulated 3D model of the human body can advantageously be matched to the person hypotheses thus found. It is advantageous in this case to model the body parts by interconnected cylinders. The posture of the person is given in this model as a vector of the joint angle of the model. The evaluation of a posture is preferably performed by determining the deviation between the features derived from the 3D-point cloud and the images of the scene, and the appearance of the model for a given posture, it thereby being possible to determine a probability that the given posture reproduces the measured shape of the person. A kernel-based particle filter [29] is particularly suitable as a probabilistic approach to the exploration of the search space.

The detected movements of the body parts are advantageously represented by motion templates. Such motion templates are here representative movement patterns that are included by 3D measurement of typical human movement cycles and delimit the space of possible joint angles and joint angle speeds of the person model. It is possible in this way to extrapolate the movements of the person in a biologically realistic fashion, particularly with the aim of detecting the risk of a collision between human and machine. In this case, a movement process can be regarded as a combined cycle of movement phases.

Literature referred to in the specification is listed below. All these literature is incorporated by reference herewith.
[1] D. Döttling, L. Krüger, W. Progscha, M. Wendler, C. Wöhler. Verfahren und Vorrichtung zur Absicherung eines Gefahrenbereichs [Method and device for securing a hazard zone]. German laid-open patent application DE 10245720 A1.
[2] D. Ebert and D. Henrich. Simero—sichere Mensch-Roboter-Koexistenz [Simero—safe human/robot coexistence]. In: Fraunhofer IRB, Ed., 2. Workshop für OTS-Systeme in der Robotik—Mensch und Roboter ohne trennende Schutzsysteme [2nd workshop for OTS systems in robotics—human and robot without separating protective systems], pp. 119-134, Stuttgart, 2003
[3] D. Gavrila. The Visual Analysis of Human Movement: A Survey. Computer Vision and Image Understanding, 73(1): 82-98, January 1999.
[4] M. Oren, C. Papageorgiou, P. Sinha, E. Osuna, T. Poggio. Pedestrian detection using wavelet templates. IEEE Int. Conf. on Computer Vision and Pattern Recognition, pp. 193-199, San Juan, 1997.
[5] C. Papageorgiou, T. Poggio. A pattern Classification Approach to Dynamical Object Detection. Int. Conf. on Computer Vision, pp. 1223-1228, Kerkyra, Greece, 1999.
[6] D. M. Gavrila, V. Philomin, Real-time object detection for "smart" vehicles. Int. Conf. on Computer Vision, pp. 87-93, Kerkyra, Greece, 1999.
[7] D. M. Gavrila, J. Giebel, S. Münder. Vision-Based Pedestrian Detection: The PROTECTOR, System. IEEE Intelligent Vehicles Symposium, Parma, Italy, 2004.
[8] C. Wöhler, Neuronale Zeitverzögerungsnetzwerke für die Bildsequenzanalyse und ihre Anwendung in fahrzeuggebundenen Bildverarbeitungssystemen. [Neural time delay networks for image sequence analysis, and application in vehicle-bound image processing systems]. Dissertation. Mathematisch-Naturwissenschaftliche Fakultät der Rheinischen Friedrich-Wilhelms-Universität Bonn, 2000 VDI-Fortschritt-Berichte, series 10, No. 645, VDI-Verlag, Düsseldorf, 2000.
[9] M. J. S. Day, J. S. Payne. A Projection Filter for Use with Parameterised Learning Models. Int. Conf. on Pattern Recognition, pp. 867-869, Brisbane, 1998.
[10] A. Baumberg, D. Hogg. An Efficient Method for Contour Tracking Using Active Shape Models. IEEE Workshop on Motion of Non-Rigid and Articulated Objects, pp. 194-199, Austin, Tex., 1994.
[11] B. Heisele, C. Wöhler. Motion-Based Recognition of Pedestrians. Int. Conf. on Pattern Recognition, pp. 1325-1330, Brisbane, 1998.
[12] D. M. Gavrila, J. Giebel, S. Münder. Vision-Based Pedestrian Detection: The PROTECTOR, System. Proc. of the IEEE Intelligent Vehicles Symposium, Parma, Italy,
[13] Y. Guo, G. Xu, S. Tsuji. Understanding Human Motion Patterns. Int. Conf. on Pattern Recognition, pp. 325-329, 1994.
[14] I.-C. Chang, C.-L. Huang. Ribbon-based Motion Analysis of Human Body Movements. Int. Conf. on Pattern Recognition, pp. 436-440, Vienna, 1996.
[15] K. Akita. Image Sequence Analysis of Real World Human Motion. Pattern Recognition. Vol. 17, No. 1, pp. 73-83, 1984.
[16] W. Long, Y. Yang. Log-Tracker, an Attribute-Based Approach to Tracking Human Body Motion, Int. J. Pattern Recog. Artificial Intell., Vol. 5, No. 3, pp. 439-458, 1991.
[17] R. Kahn, M. Swain, P. Propkowicz, J. Firby. Gesture Recognition Using the Perseus Architecture. IEEE Conference on Computer Vision and Pattern Recognition, pp. 734-741, San Francisco, 1996.
[18] B. Rosenhahn, U. G. Kersting, A. W. Smith, J. K. Gurney, T. Brox, R. Klette. A System for Marker-less Human Motion Estimation. In: W. Kropatsch, R. Sablatnig, A.

Hanbury (eds.). Pattern Recognition. Proc. 27th DAGM Symposium, Vienna, Austria. Lecture Notes in Computer Science 3663, pp. 176-183; Springer-Verlag Berlin Heidelberg, 2005.

[19] S. U. Lee, I. Cohen. 3D Hand Reconstruction from a Monocular View. Int. Conf. on Pattern Recognition, Cambridge, UK, 2004.

[20] A. Ramamoorthy, N. Vaswani, S. Chaudhury, S. Banerjee. Recognition of dynamic hand gestures. Pattern Recognition, Vol. 36, pp. 2069-2081, 2003.

[21] C. Nölker, H. Ritter. Visual Recognition of Continuous Hand Postures. IEEE Transactions on Neural Networks, Special Issue Multimedia, 2002.

[22] G. Heidemann, H. Bekel, I. Bax, A. Saalbach. Hand Gesture Recognition: Self-Organising Maps as a Graphical User Interface for the Partitioning of Large Training Data Sets. Int. Conf. on Pattern Recognition, Cambridge, UK, 2004.

[23] J. Fritsch, N. Hofemann, G. Sagerer. Combining Sensory and Symbolic Data for Manipulative Gesture Recognition. Int. Conf. on Pattern Recognition, Cambridge, UK, 2004.

[24] Z. Li, N. Hofemann, J. Fritsch, G. Sagerer. Hierarchical Modelling and Recognition of Manipulative Gesture. In Proc. IEEE ICCV, Workshop on Modeling People and Human Interaction, Beijing, China, 2005.

[25] J. Fritsch, F. Lömker, M. Wienecke, G. Sagerer. Erkennung von Konstruktionshandlungen aus Bildfolgen [Detection of building actions from image sequences]. In: Mustererkennung 2000, 22. DAGM-Symposium [Pattern recognition 2000, 22nd DAGM symposium], Informatik aktuell. pp. 389-396, Kiel, 2000

[26] E. Braun, J. Fritsch, G. Sagerer. Incorporating Process Knowledge into Object Recognition for Assemblies. IEEE Conf. on Computer Vision, pp. 726-732, Vancouver.

[27] H. Bekel, I. Bax, G. Heidemann, H. Ritter. Adaptive Computer Vision: Online Learning for Object Recognition. In: C. E. Rasmussen, H. H. Bütlthoff, M. A. Giese, B. Schölkopf (eds.). Pattern Recognition. Proc. 26th DAGM Symposium, Tubingen, Germany. Lecture Notes in Computer Science 3175, pp. 447-454, Springer-Verlag Berlin Heidelberg, 2004.

[28] C. Wöhler, L. Krüger. Verfahren und Vorrichtung zur Korrespondenzbestimmung, vorzugsweise zur dreidimensionalen Rekonstruktion einer Szene [Method and device for determining correspondence, preferably for the three-dimensional reconstruction of a scene]; German patent application DE 102006013598.9, published after the priority date.

[29] C. Chang, R. Ansari, A. Khokhar. Multiple object tracking with kernel particle filter. IEEE Int. Conf. on Computer Vision and Pattern Recognition, Vol. 1, pp. 566-573, 2005.

[30] Horprasert, T. Haritaoglu, I., Harwood, D., et al. Realtime 3D motion capture. In Proc. Perceptual User Interfaces, pages 87-90, November 1998.

[31] I. Mikic, M. Trivedi, E. Hunter, and P. Cosman. Human body model acquisition and tracking using voxel data. International Journal on Computer Vision, 53(3):199-223, July 2003.

[32] M. Pardàs et al., Body detection, tracking and analysis, WP5 partners first focus meeting, 1-2 Dec. 2005, Rocquencourt, slides, http://www-rocq.inria.fr/imedia/Muscle/WP5/WP5-FFM-docs/E-TEAM-BODY-3.ppt.

What is claimed is:

1. A method for observation of a person in an industrial environment comprising a moveable machine element, the method comprising the steps of
acquiring image data of the person by means of a multi-camera system,
analyzing the image data in order to produce a person hypothesis representing the person,
providing an articulated virtual 3D model of a human body,
matching the articulated virtual 3D model of the human body to the person hypothesis in order to generate a movement behavior representation,
determining an instantaneous position of the machine element,
determining a hazard potential depending on the position of the machine element and the movement behavior representation, and
controlling the machine element as a function of the hazard potential.

2. The method of claim 1, wherein the machine element is slowed down or shut down whenever the hazard potential exceeds a predefined threshold.

3. A method for observation of a person in an industrial environment comprising a moveable machine element, the method comprising the steps of
acquiring image data of the person by means of a multi-camera system,
analyzing the image data in order to produce a person hypothesis representing the person,
providing an articulated virtual 3D model of a human body,
matching the articulated virtual 3D model to the person hypothesis,
providing a database containing a plurality of reference data representing a reference movement cycle of the person, the reference data having been determined from shape and position of the articulated virtual 3D model during a plurality of reference movement phases,
generating current data representing a current movement of the person as a function of a current shape and position of the articulated virtual 3D model,
correlating the current data with the reference data from the database,
wherein a current movement phase is detected whenever the current data exhibits a predefined degree of similarity to the reference data,
wherein a movement cycle is assessed as having been completely carried out by the person whenever a specific sequence of current movement phases has been detected, and
wherein a signal is produced whenever an incomplete movement cycle is determined.

4. The method of claim 3, wherein the signal comprises in indication of a missing part in the incomplete movement cycle.

5. The method of claim 4, further comprising a statistical acquisition of missing parts.

6. The method of claim 3, wherein the reference data are generated by means of a plurality of training cycles.

7. The method of claim 3, wherein the reference data are generated by means of simulation.

8. The method of claim 3, wherein the reference data are subjected to a transformation in order to produce transformed reference data, with the step of correlating being performed on the basis of the transformed reference data.

9. The method of claim 1, wherein the articulated virtual 3D model is created on the basis of 3D point data including information relating to spatial coordinates.

10. The method of claim 8, wherein the 3D point data are combined in a cluster as a function of predefined person-specific limiting values.

11. The method of claim 9, wherein two individual clusters are combined to form a common cluster representing the person, whenever the two individual clusters do not overlap and the resulting common cluster falls within the person-specific limiting values.

12. The method of claim 9, wherein the industrial environment comprises a floor, and a projection of the cluster onto the floor is determined and tracked in order to continuously match the articulated virtual 3D model the person during movement.

13. The method of claim 12, wherein the projection is tracked by means of linear prediction and Kalman filtering.

14. The method of claim 1, wherein a probability of match is determined, the probability of match representing a probability with which a given posture of the articulated, virtual 3D model represent the current shape of the person.

* * * * *